United States Patent [19]

Culp et al.

[11] Patent Number: 4,510,398
[45] Date of Patent: Apr. 9, 1985

[54] ADD/SHED LOAD CONTROL ACCORDING TO MULTIPLE ADD/SHED SEQUENCES

[75] Inventors: Charles H. Culp, Mundelein; Denise J. Downar, Palatine, both of Ill.

[73] Assignee: Honeywell Inc., Minneapolis, Minn.

[21] Appl. No.: 561,002

[22] Filed: Dec. 13, 1983

[51] Int. Cl.³ ............................................... H02J 3/14
[52] U.S. Cl. ......................................... 307/35; 307/38; 307/39; 307/41; 364/483; 364/493
[58] Field of Search .................... 307/35, 38, 39, 41; 364/483, 492, 493

[56] References Cited

U.S. PATENT DOCUMENTS

| 4,125,782 | 11/1978 | Pollrow, Jr. | 364/493 X |
| 4,167,786 | 9/1979 | Miller et al. | 364/493 |
| 4,211,933 | 7/1980 | Hedges et al. | 307/38 X |
| 4,216,384 | 8/1980 | Hurley | 307/35 X |
| 4,337,401 | 6/1982 | Olson | 307/39 |
| 4,354,241 | 10/1982 | Barello | 364/492 |

Primary Examiner—A. D. Pellinen
Assistant Examiner—Derek S. Jennings
Attorney, Agent, or Firm—Trevor B. Joike

[57] ABSTRACT

An add/shed system for adding/shedding loads to maintain a building's power consumption below a predetermined level, each load being assigned to one of the multiple types of add/shed routines, each routine controlling the adding/shedding of the loads in a different sequence.

17 Claims, 3 Drawing Figures

ABD/SHED LOAD CONTROL ACCORDING TO
MULTIPLE ADD/SHED SEQUENCES

BACKGROUND OF THE INVENTION

The present invention relates to a system for maintaining power consumption below a predetermined level and, more particularly, to an add/shed control for maintaining power consumption below a predetermined level where the loads can be added and/or shed in different sequences depending upon the prioritization level given to each load and upon the add/shed sequence assigned to each prioritization level.

Power utilities charge their customers according to a policy which is designed both to encourage energy conservation and to assess the cost for the extra power generating equipment which they must acquire and maintain to meet peak demands against those creating the peak demand. Accordingly, these power utilities will typically charge their customers at a first rate for power consumed below a first predetermined level, at a second rate for power consumed between the first predetermined level and a second predetermined level. If power consumption should exceed the second predetermined level, the utilities will charge what is in effect a penalty because they have had to acquire and maintain extra power generating equipment to meet these periods of unusually high demand. If all of the utilities customers could be encouraged to eliminate excessive usage of power, the power utilities would then not be required to provide the extra equipment to generate the extra power during these peak demand periods and would be able presumably to pass along these savings to its customers through lower charges. In order to encourage economies in power consumption by their customers, the public utilities, therefore, charge a "penalty" on those customers who create peak demands.

In order to avoid these peak demand charges imposed upon them by their power utilities, power consumers have employed automatic control systems which monitor power consumption within their facilities and will control the energization state of the power consuming loads within their facilities to maintain power consumption below some predetermined value in order to reduce the extra charges which would be imposed upon them during peak demand periods or intervals. These systems have typically taken the form of add/shed control systems which are designed to shed loads as power consumption approaches a predetermined level which is established by the customer. Alternatively, as power consumption begins to fall away from this predetermined level, previously shed loads can be added back on line so that they may be utilized by the customer.

Several different types of add/shed control systems have been proposed in the past. For example, the most common type of add/shed control system establishes a prioritized load order wherein the load having lowest priority will be shed first and the load having highest priority will be shed last. In such a system, if loads can be added back on line, the load having the highest priority will be added first and the load having the lowest priority will be added last.

Another add/shed system which is known adds/sheds loads on the basis of comfort fairness. That is, the loads associated with zones having conditions closest to setpoint will have the lowest priority and loads associated with zones having conditions the farthest away from setpoint will have the highest priority. In this system, the loads having lowest priority will be shed first and the loads having highest priority will be shed last on the basis that it is more fair to shed the loads associated with the zones being closes to the comfort range first.

These systems, however, are inflexible because rarely can all the loads within a building be made to fit within one of these types of add/shed routines. For example, it is more desirable to shed the air handling fan systems within the building according to a comfort fairness routine than according to a sequential routine because a sequential routine is a fixed routine and will not necessarily result in fair control of the air handling fan systems. On the other hand, the outdoor lights certainly would not be shed on the basis of comfort fairness and it may also be determined that the outdoor lights are all of equal priority so that they could not be prioritized according to a sequential routine. Thus, the outdoor lights may be shed rotationally so that the first shed will also be the first added.

SUMMARY OF THE INVENTION

Accordingly, the present invention provides an add/shed system for adding/shedding loads to maintain a building's power consumption below a predetermined level, each load being assigned to one of multiple types of add/shed routines, each routine controlling the adding/shedding of the loads in a different sequence.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
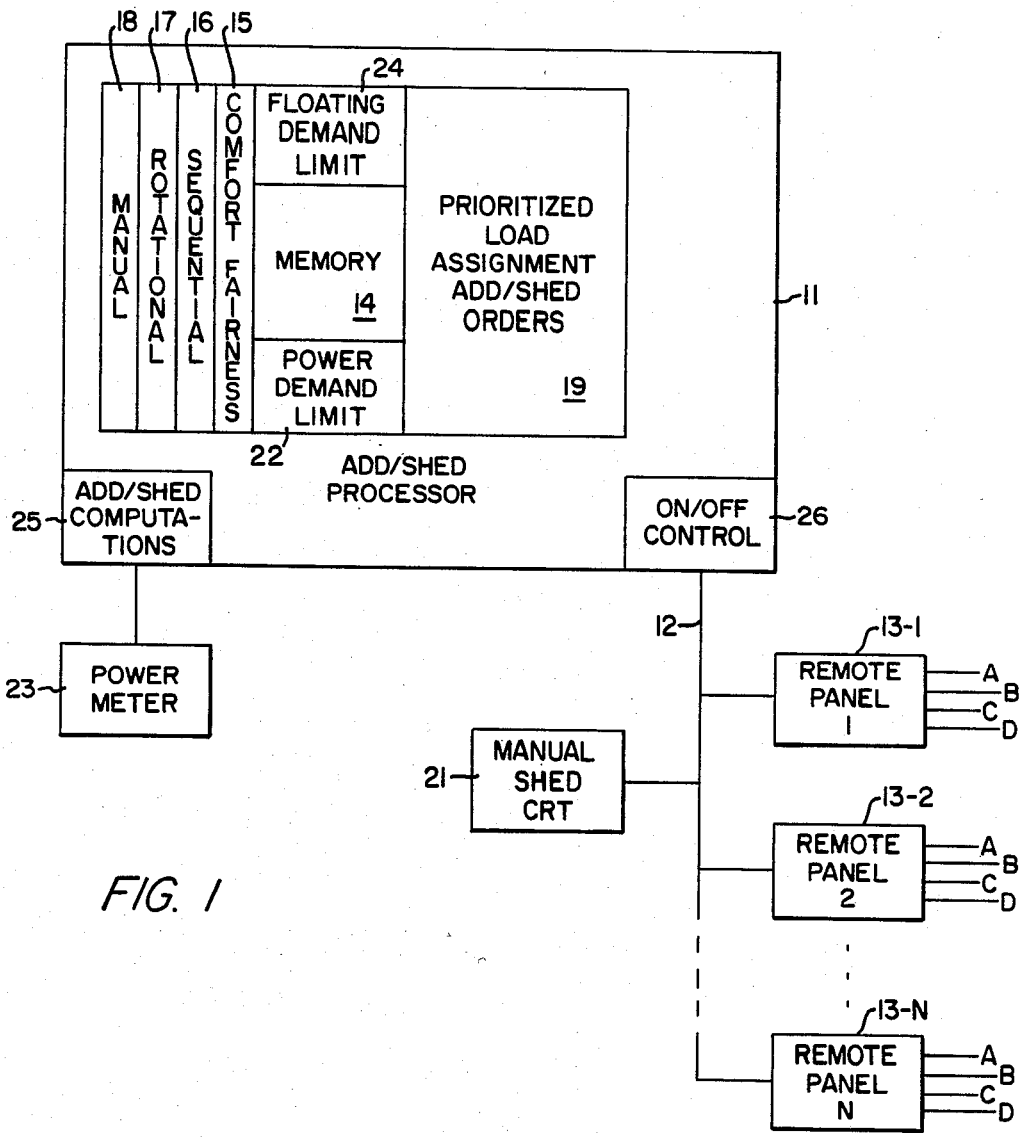
FIG. 1 shows a functional block diagram of the system according to the present invention.

As shown in FIG. 1, an add/shed processor 11 is connected by a communication channel 12 to a plurality of remote panels 13-1 through 13-N. Each remote panel can control, for example, four loads A–D. In such a system, if the add/shed processor 11 wished to turn off load D associated with remote panel 13-N, the processor would construct a message addressing remote panel 13-N and instructing that panel to turn off load D through on/off control portion 26. The add/shed processor and remote panels 13-1 through 13-N can be provided in any of the Delta systems manufactured and sold by Honeywell Inc.

According to the present invention, add/shed processor 11 is provided with memory 14 which is arranged to control the loads associated with the remote panels according to one of a plurality of add/shed routines. These add/shed routines may be a comfort fairness routine 15, a sequential routine 16, a rotational routine 17 and a manual routine 18.

For added flexibility, section 19 of memory 14 is provided with a plurality of shed orders. Each routine 15–18 is assigned to at least one or perhaps more of the shed orders provided in 19. Each load controlled by the remote panels 13-1 through 13-N is then assigned to one of the shed orders. For example;

| | |
|---|---|
| Shed Order 1 | Rotational |
| Shed Order 2 | Sequential |
| Shed Order 3 | Comfort Fairness |
| Shed Order 4 | Rotational |
| Shed Order 5 | Sequential |
| Shed Order 6 | Comfort Fairness |
| Shed Order 7 | Rotational |
| Shed Order 8 | Sequential |
| Shed Order 9 | Comfort Fairness |
| Shed Order 10 | Rotational |
| Shed Order 11 | Sequential |
| Shed Order 12 | Comfort Fairness |
| Shed Order 13 | Rotational |
| Shed Order 14 | Sequential |
| Shed Order 15 | Comfort Fairness |
| Shed Order 16 | Rotational |
| Shed Order 17 | Sequential |
| Shed Order 18 | Comfort Fairness |
| Shed Order 19 | Rotational |
| Shed Order 20 | Sequential |
| Shed Order 21 | Comfort Fairness |
| Shed Order 22 | Manual |

In assigning loads to these shed orders, not all shed orders have to be assigned loads. As an example, if it is decided that the loads having the lowest priority should be shed sequentially, these loads are then assigned to shed order 2 rather than to shed order 1. Shed order 1 will have no loads assigned to it. Shed order 1 is the first level to be shed and so on with shed order 21 being the last order to be shed. Shed order 22 will be discussed hereinafter. If no loads are assigned to shed order 1, the system will simply skip to shed order 2 for shedding any loads which have to be shed.

The rotational routine is similar to a first shed, first added routine. That is, when any load can be added back on line, the load which was first shed will be the load first added. This routine can also be used to even out the shedding and adding of loads. For example, if there are three loads assigned to shed order 1, but only the first two loads are shed and then added back on line, the next time loads have to be shed, the system will begin with load 3.

The sequential routine operates on the principle that all loads in a shed order to which is assigned a sequential routine are prioritized within the shed order. Thus, the load which is first shed is the load having the lowest priority with the level. On the other hand, the load which is first added is the load last shed, that is, of the loads which were previously shed, the first load that will be added will be the load having the highest priority.

The comfort fairness routine is a floating type of sequential routine in nature. That is, the loads within the shed order are prioritized but they are prioritized on the basis of comfort fairness rather than a predetermined sequence. Comfort fairness prioritization dictates that the loads associated with the zone being closest to setpoint will have the lowest priority and loads associated with zones being farthest away from setpoint will have the highest priority. Thus, it is more desirable to shed loads associated with zones which are most near comfortable conditions than loads associated with zones being the farthest away from comfortable conditions.

Finally, the manual shed routine at shed order 22 requires that the human operator take action to indicate which loads assigned at this shed order level should be shed. Along these lines, therefore, manual shed CRT 21 is provided so that the loads assigned to shed order 22 can be displayed if all of the loads assigned to shed orders 1–21 have been shed and if power consumption is still threatening to exceed the power demand limit established within memory section 22.

As an example of how loads can be shed according to shed orders, it can be assumed that a building has four outdoor light loads, four air handling fan loads, two indoor lighting reduction loads, three lavatory hot water heater loads, two chiller loads and three non-critical process loads (washing machines, etc.).

The user of these loads may then determine that the outdoor lights have the lowest priority and should be shed first. The user may also determine that the four outdoor light loads need not be prioritized with respect to one another and can be, therefore, shed on a rotational basis. Accordingly, the outdoor light loads are assigned to shed order 1. Next, the loads which can be shed after the outdoor light loads according to the user's assessments of his loads and their priorities may be the four lavatory hot water heater loads. Again, the user may determine that these loads cannot be prioritized with respect to one another and should be, therefore, shed rotationally. Thus, these loads are assigned to shed order 4. Shed orders 2 and 3 will, therefore, remain unassigned. The indoor lighting reduction loads may be determined to have the next lowest priorities. It may also be determined that one of the indoor lighting reduction loads has a lower priority than the other indoor lighting reduction loads. Therefore, these loads are assigned to shed order 5 and are arranged within this shed order in a priority sequence to be shed sequentially. The non-critical process loads may be next on the priority list but may not have any priority with respect to one another. Therefore, these loads should be assigned to a rotational routine. The next rotational routine in the shed orders as described above is shed order 7. Therefore, these three non-critical process loads will be assigned to shed order 7 and will not be assigned a priority within the shed order. The air handling fan loads are considered to fall next on the priority list. These loads relate to comfort fairness and, therefore, should be assigned to shed order 9. Finally, the user may determine that the chiller loads should not be shed except by conscious human operator decision. Therefore, these loads are assigned to shed order 22 and will be displayed on manual shed CRT 21 should all of the loads assigned to shed orders 1–21 be shed and there is still a danger of exceeding the power demand limit. These loads are not shed automatically and are only shed by manual control.

It should be noted that the user in the above example has skipped shed orders. As will be seen in connection with FIG. 2, any shed orders to which no loads have been assigned will be skipped as the processor determines which loads should be shed and in fact sheds them.

In order to determine which loads should be shed, processor 11 is connected to power meter 23 so that processor 11 can read power consumption and compare power consumption against the power demand limit 22 for initiating the add/shed process. Although any type of power meter can be used, the power meters supplied utilities are adequate for the purposes of processor 11. These meters will typically provide KW pulses which are indicative of power consumption and end of interval sync pulses to indicate the intervals over which power measurements are made. Thus, processor 11 can measure power consumption over the same intervals provided by power meter 23 so that processor 11 can periodically sample power consumption to determine whether the add/shed routines should be entered.

Figure 2:
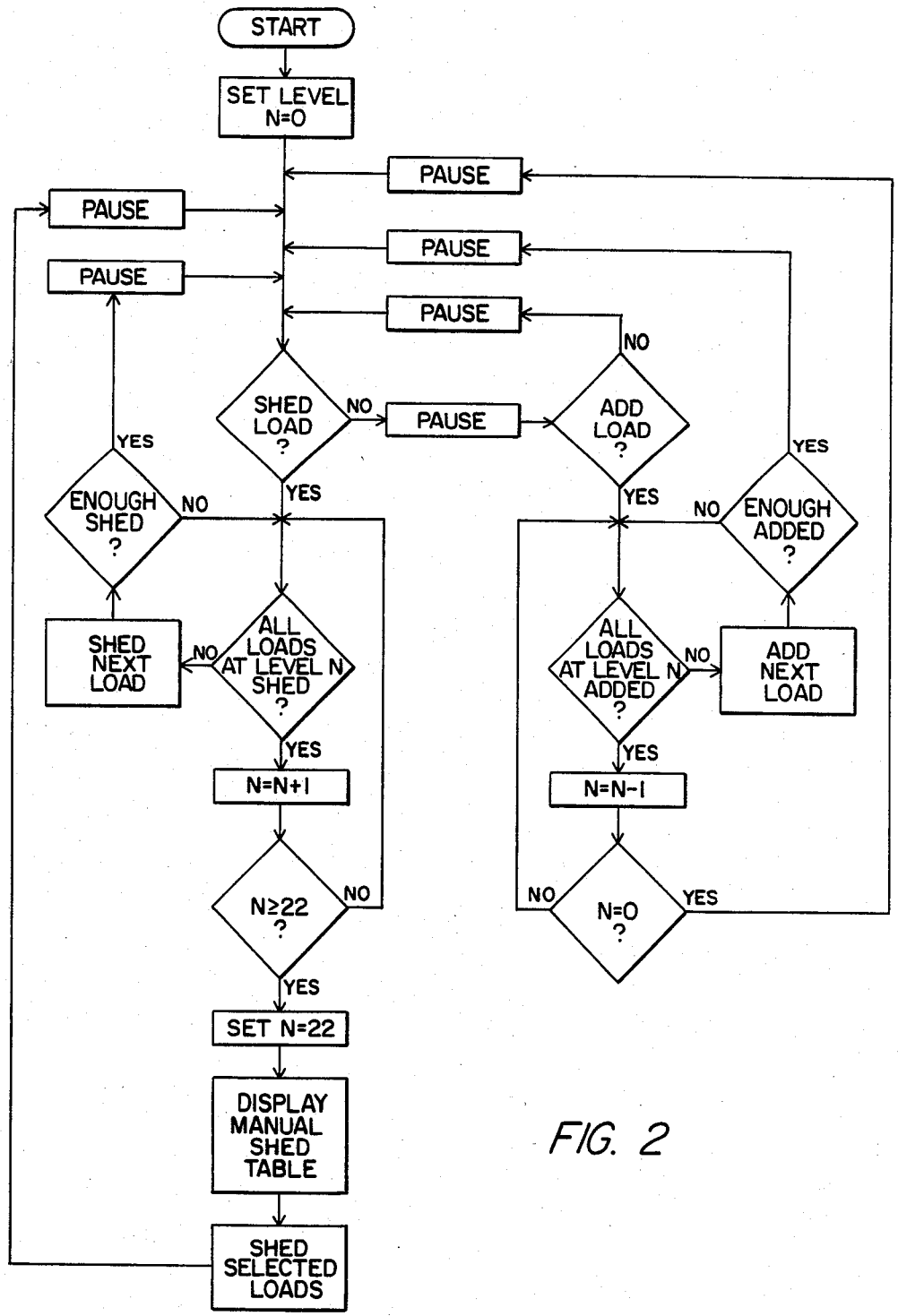
FIG. 2 is a flow chart for controlling the adding/shedding of the loads.

Each time the add/shed interval is entered, such as on power up, the value N, which represents the shed order, is set to 0. The system will then determine, as shown in FIG. 2, whether any loads have to be shed. If no loads have to be shed, the system pauses and then determines whether or not any loads should be added. If no loads should be added, the processor pauses for a predetermined amount of time and then re-enters the decision making cycle.

If loads have to be shed, the processor will determine whether or not all loads at the level N, which was initially set to 0, have been shed. Since there is no shed order 0, the answer must be that all loads at this order have been shed. N is accordingly incremented to 1 and the system will then determine if all loads at this level/order have been shed. If they have not, the processor will shed the load according to the procedure shown in FIG. 3. After the load has been shed, the processor will test whether or not enough load has been shed. If enough load has been shed, the system will then pause before it enters the decision making cycle again.

If enough load has not been shed the processor will then test to determine whether there are any more loads at that level to be shed. If all loads at that level have been shed, the processor will increment to the next level by adding 1 to the old value for N and testing whether the new N value is less than 22. If the N value is less than 22, the system will then determine whether or not there are any loads at that level to be shed. If there are not, it will shed the next load and test whether or not enough load has been shed.

During this procedure, two circumstances will eventually evolve. Either, enough load has been shed at which time the system will pause and then periodically determine whether it has to shed any further loads or whether it can add the shed loads. Or, all loads assigned to the first 21 shed orders have been shed in which case, if more loads still need to be shed, the system will then set N equal to 22 and display the loads, which can be manually shed, on the manual shed CRT 21. The operator then has the option to shed whichever loads he chooses. The system then pauses before it will next determine whether loads should be further shed or added.

At the point where enough load has been shed, the value for N will be at some number depending upon the number of loads which have been shed. For example, if less than all of the sheddable loads have been shed, N could have some value less than 22. If all of the sheddable loads have been shed automatically, the value of N will be 22. If the value of N is less than 22 and power consumption within the building should begin increasing towards the power demand limit, additional loads will be shed and the value for N may increase.

On the other hand, if after a pause, the processor, in testing whether or not loads should be shed or added, determines that loads can be added, the value of N will decrease if enough loads can be added back on line. Thus, the processor will determine whether all loads at the present shed order level N have been added. If not, it will add the next load and determine whether enough load has been added. If enough load has been added, the system will pause before it enters the decision process again. If enough load has not been added, the processor will again determine whether all the loads at that level have been added. If all loads have been added, the value of N is decremented by 1 and the processor will test whether N is equal to 0. If N is equal to 0, then all the loads which can be added back into the system have been added and the system will then pause before the next add/shed test is made. If during the next add/shed test, there is an indication that loads should be shed, the system will then determine whether all the loads at shed order 0 have been shed. Since there are no loads at this level, the value of N is incremented by 1 and the test is then made at shed order level 1.

Figure 3:
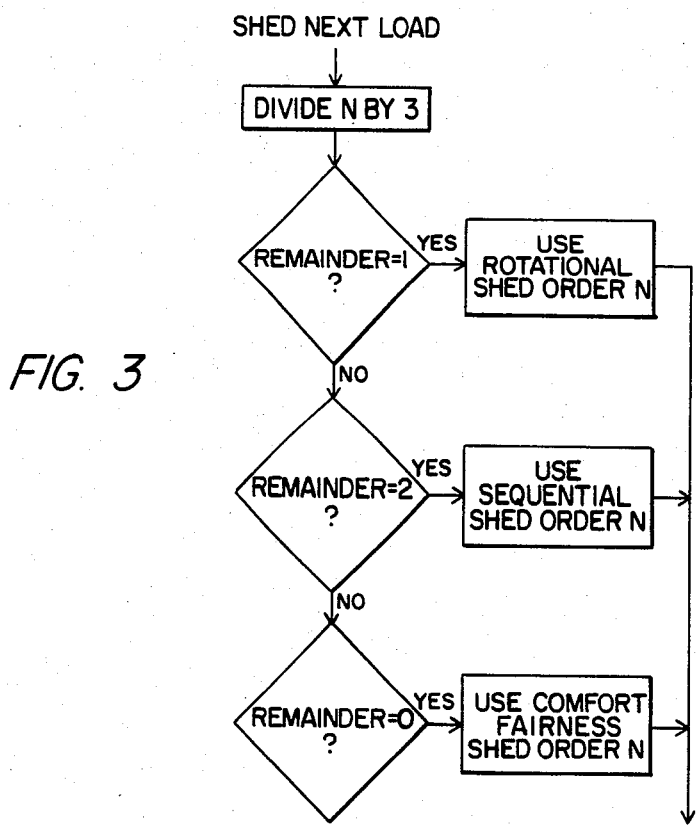
FIG. 3 is a flow chart showing the determination of which add/shed routines apply to which loads.

The "shed next load" routines are shown in FIG. 3. If the next load is to be shed, processor 11 will divide the value of N by 3. If there is a remainder of 1, then the rotational shed routine is utilized. If the remainder is 2, the sequential shed routine is utilized. If there is no remainder, the comfort fairness shed routine is used. According to the process shown in FIG. 3, all shed orders in the series 1, 4, 7 etc. will be assigned to the rotational routine, all shed orders in the series 2, 5, 8 etc. will be assigned to the sequential routine and all shed orders which are a multiple of 3 will be assigned to the comfort fairness routine. The rotational and sequential routines both involve predetermined sequences. The comfort fairness routine involves a variable sequence and may be similar to the routine disclosed in U.S. Pat. No. 4,337,401. Although it is not shown, the "add next load" routine will be similar to that shown in FIG. 3.

It may be desirable to increase energy savings by providing a second demand limit which is lower than the power demand limit so that certain non-essential loads can be shed for the express purpose of lowering energy costs regardless of whether the power consumption approaches the power demand limit. In such a case, a floating demand limit 24 is provided in memory 14. Processor 11 can use the floating demand limit 24 in order to shed the loads assigned to a preselected number of shed orders. For example, as power consumption approaches the floating demand limit 24, the loads assigned to the first 9 shed orders can be shed to maintain power consumption below the floating demand limit. If power consumption continues to increase above this limit, the floating demand limit floats upwards so that no other loads assigned to shed orders 10–22 will be shed. However, when the floating demand limit approaches the power demand limit 22, the remaining loads assigned to shed orders 10–22 are eligible for shed.

The embodiments of the invention in which an exclusive property or right is claimed are defined as follows:

1. An add/shed system for adding/shedding loads to maintain a building's power consumption below a predetermined level, each load being assigned to at least one of multiple types of add/shed routines, each routine controlling the adding/shedding of said loads in a different sequence, said system comprising:
   a plurality of loads; and,
   processor means connected to said plurality of loads and adapted to be connected to a power meter for determining which of said plurality of loads should be added/shed to maintain power consumption below said predetermined level and for determining which type of the multiple types of add/shed routine is assigned to each load, said processor means for adding/shedding each load according to its assigned routine.

2. The system of claim 1 wherein said processor means includes means for determining which of said plurality of loads are assigned to a rotational routine for shedding and adding loads on the basis that the first load shed is the first load added and which are assigned to a comfort fairness routine for adding and shedding loads on the basis that the load associated with zones having the least deviation from comfort is shed first.

3. The system of claim 1 wherein said processor means includes means for determining which of said plurality of loads are assigned to a rotational routine for shedding and adding loads on the basis that the first load shed is the first load added and which are assigned to a sequential routine for shedding and adding loads on the basis that the last load shed is the first load added.

4. The system of claim 1 wherein said processor means includes means for determining which of said loads are assigned to a sequential routine for shedding and adding loads on the basis that the last load shed is the first load added and which are assigned to a comfort fairness routine for adding and shedding loads on the basis that the load associated with the zone having the least deviation from comfort is shed first.

5. The system of claim 1 wherein said processor means includes means for determining which of said loads are assigned to a rotational routine for adding and shedding loads on the basis that the first load shed is the first load added, which are assigned to a comfort fairness routine for adding and shedding loads on the basis that the load associated with the zone having the least deviation from comfort is shed first, and which are assigned to a sequential routine for adding and shedding loads on the basis that the last load shed is the first load added.

6. The system of claim 5 wherein said processor means includes means for determining which loads should be manually shed and for displaying the loads to be manually shed to a human operator.

7. An add/shed system for adding/shedding loads to maintain a building's power consumption below a predetermined level, each load being assigned to one of a plurality of shed orders depending upon a preassigned add/shed priority, each shed order being assigned to one of multiple types of add/shed routines, each different type of routine controlling the sequence of adding/shedding of the loads assigned to its associated order, any of the multiple of types of add/shed routines capable of being assigned to more than one shed order, said system comprising:

a plurality of loads; and, processor means connected to said plurality of loads and adapted to be connected to a power meter for determining which of said plurality of loads should be added/shed to maintain power consumption below said predetermined level and for determining which shed order and which multiple type of add/shed routine are assigned to each load, said processor means for adding/shedding each load first according to its shed order and then according to the routine assigned to the shed order.

8. The system of claim 7 wherein said processor means includes means for determining which of said plurality of loads are assigned to a rotational routine for shedding and adding loads on the basis that the first load shed is the first load added and which are assigned to a comfort fairness routine for adding and shedding loads on the basis that the load associated with zones having the least deviation from comfort is shed first.

9. The system of claim 7 wherein said processor means includes means for determining which of said plurality of loads are assigned to a rotational routine for shedding and adding loads on the basis that the first load shed is the first load added and which are assigned to a sequential routine for shedding and adding loads on the basis that the last load shed is the first load added.

10. The system of claim 7 wherein said processor means includes means for determining which of said loads are assigned to a sequential routine for shedding and adding loads on the basis that the last load shed is the first load added and which are assigned to a comfort fairness routine for adding and shedding loads on the basis that the load associated with the zone having the least deviation from comfort is shed first.

11. The system of claim 7 wherein said processor means includes means for determining which of said loads are assigned to a rotational routine for adding and shedding loads on the basis that the first load shed is the first load added, which are assigned to a comfort fairness routine for adding and shedding loads on the basis that the load associated with the zone having the least deviation from comfort is shed first, and which are assigned to a sequential routine for adding and shedding loads on the basis that the last load shed is the first load added.

12. The system of claim 7 wherein said processor means includes means for shedding loads associated with up to a predetermined number of shed orders as power consumption within said building approaches a floating demand limit and for allowing said floating demand limit to float upward as power consumption increases until said floating demand limit bears a predetermined relationship with a power demand limit at which time loads associated with the remaining shed orders can be shed.

13. The system of claim 12 wherein said processor means includes means for determining which of said plurality of loads are assigned to a rotational routine for shedding and adding loads on the basis that the first load shed is the first load added and which are assigned to a comfort fairness routine for adding and shedding loads on the basis that the load associated with zones having the least deviation from comfort is shed first.

14. The system of claim 12 wherein said processor means includes means for determining which of said plurality of loads are assigned to a rotational routine for shedding and adding loads on the basis that the first load shed is the first load added and which are assigned to a sequential routine for shedding and adding loads on the basis that the last load shed is the first load added.

15. The system of claim 12 wherein said processor means includes means for determining which of said loads are assigned to a sequential routine for shedding and adding loads on the basis that the last load shed is the first load added and which are assigned to a comfort fairness routine for adding and shedding loads on the basis that the load associated with the zone having the least deviation from comfort is shed first.

16. The system of claim 12 wherein said processor means includes means for determining which of said loads are assigned to a rotational routine for adding and shedding loads on the basis that the first load shed is the first load added, which are assigned to a comfort fairness routine for adding and shedding loads on the basis that the load associated with the zones having the least deviation from comfort is shed first, and which are assigned to a sequential routine for adding and shedding loads on the basis that the last load shed is the first load added.

17. The system of claim 16 wherein said processor means comprises means for assigning the last shed order to a manual shed routine in which loads must be manually shed if power consumption continues to increase even after the loads associated with all other shed orders have been shed.

* * * * *